June 14, 1938. F. V. W. SWANTON 2,120,516
APPARATUS AND PROCESS FOR DESILTING NATURAL STREAMS OF WATER
Filed Aug. 10, 1934 2 Sheets-Sheet 1
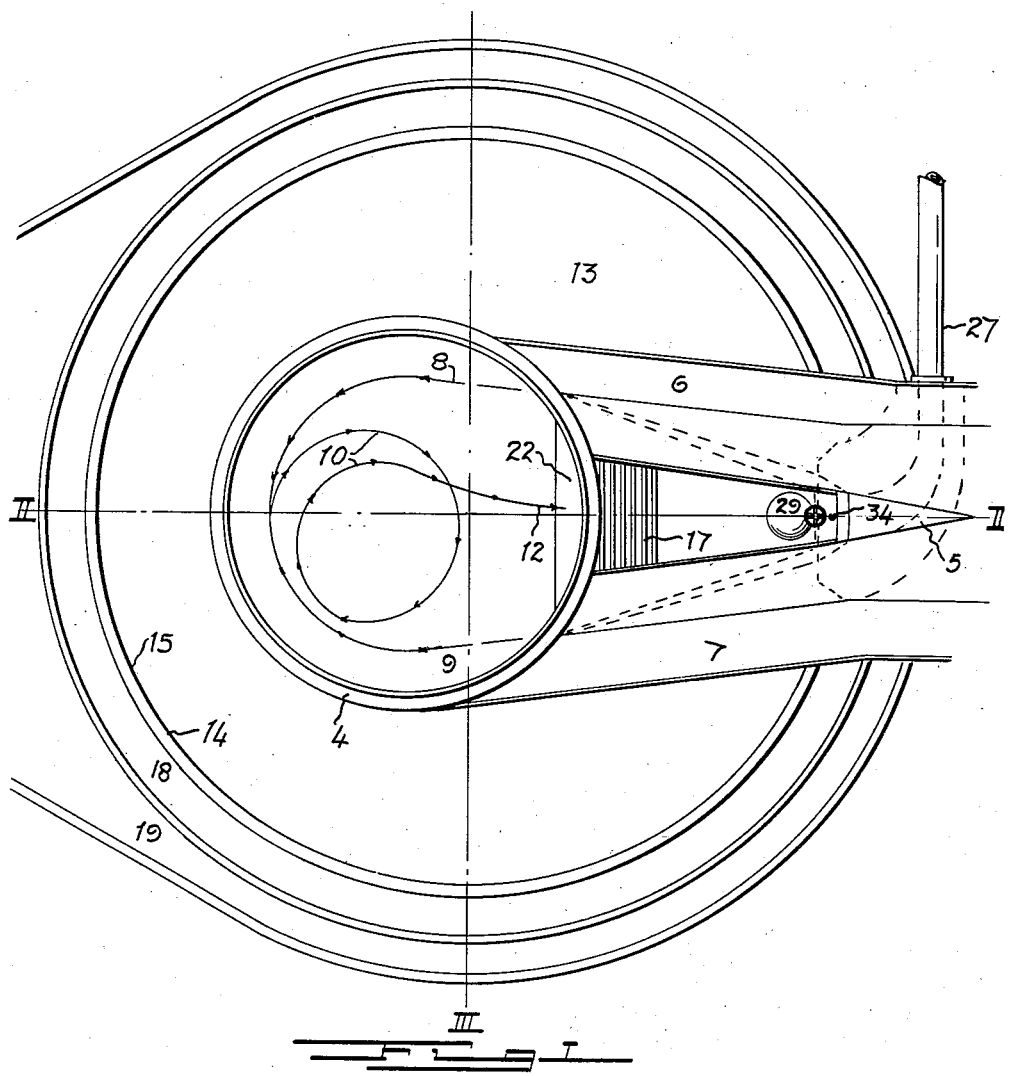
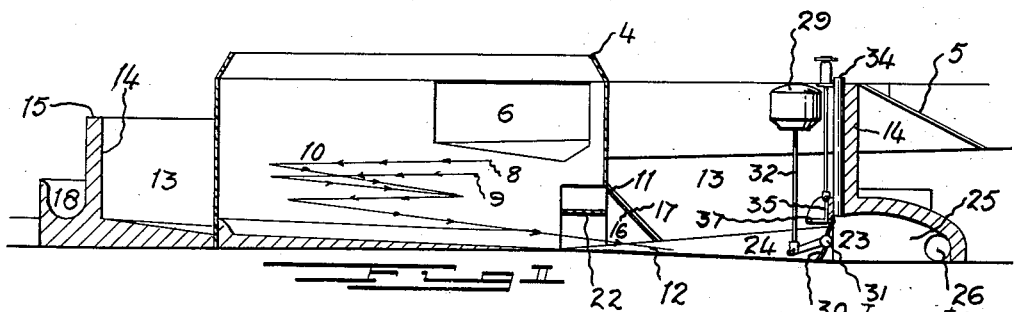
Inventor:
F. V. W. Swanton June 14, 1938.  F. V. W. SWANTON  2,120,516
APPARATUS AND PROCESS FOR DESILTING NATURAL STREAMS OF WATER
Filed Aug. 10, 1934  2 Sheets-Sheet 2
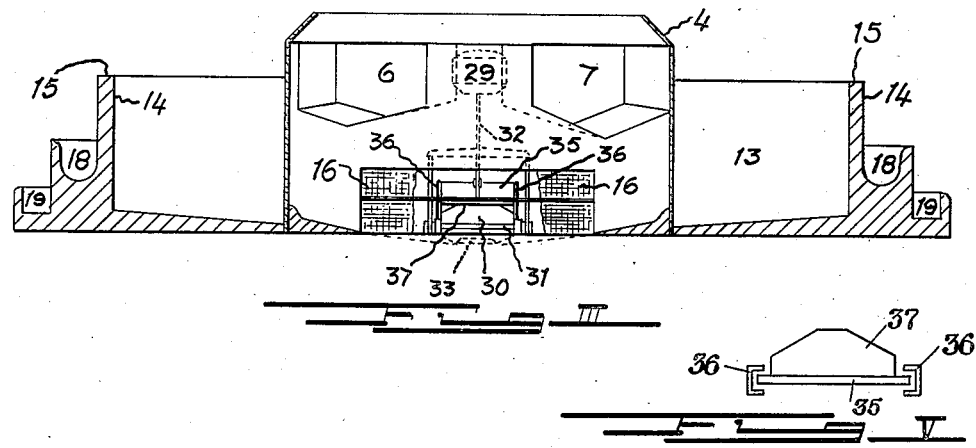
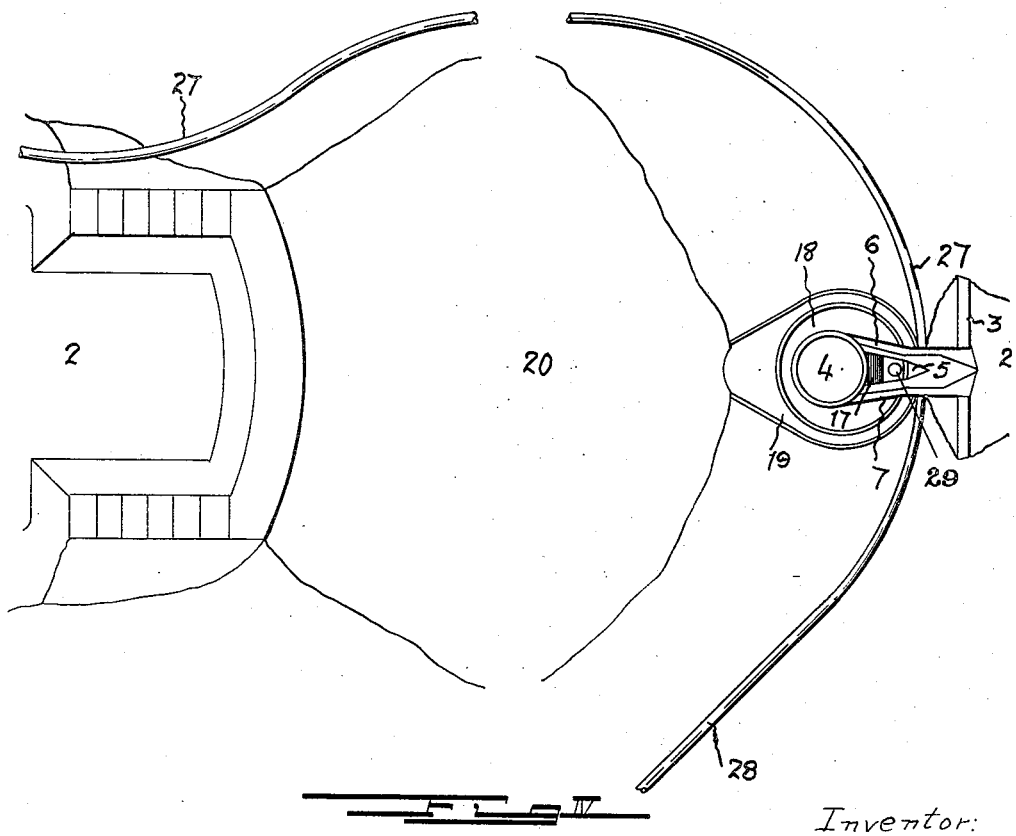
Inventor:
F. V. W. Swanton
By Emil Bömelyke
Attorney Patented June 14, 1938

2,120,516

UNITED STATES PATENT OFFICE 2,120,516

APPARATUS AND PROCESS FOR DESILTING NATURAL STREAMS OF WATER

Frederick Victor William Swanton, Johannesburg, Transvaal, Union of South Africa, assignor of one-half to Charles Perlman, Johannesburg, Transvaal Province, Union of South Africa Application August 10, 1934, Serial No. 739,323
In Union of South Africa August 24, 1933

14 Claims. (Cl. 61—2)

The present invention relates to the removal of silt from natural streams of water, so that for instance a dam fed by a stream may be prevented from silting up with undue rapidity, or silt may be conserved at relatively high levels above the sea and deposited in favourable positions to form or improve farm land.

According to the invention, silt is concentrated into a portion of the stream and maintained in suspension in said portion, which is separated from the remainder of the stream and discharged separately therefrom.

According further to the invention, the flowing water is so treated by modification of its movement that silt is precipitated from it; and a local current is formed in a position to receive the precipitated silt and of such velocity as to maintain in suspension the silt thus received by it, said current being separated from the silt-impoverished water and employed to discharge the silt where desired, for example into the stream channel beyond a reservoir or at a position where the creation or enrichment of lands is desired.

One form of plant for de-silting a stream is shown in the accompanying drawings in which:—

Figure I is a plan;

Figure II is a sectional elevation on II—II Figure I;

Figure III is a sectional elevation on III—III Figure I;

Figure IV shows the arrangement of the apparatus in connection with a reservoir.

Figure V is a detail view.

2 indicates the channel of a stream, the flow of which is preferably controlled immediately before its entrance to the de-silting plant by a weir 3. The latter tends to maintain the water at a suitable level for entering the de-silting plant, and to equalize the flow.

4 indicates a receptacle or sump which is preferably circular in plan. The sump is kept filled by the stream, which flows through it; and the function of the sump is to cause the precipitation of silt from the body of water maintained in it by the inflowing stream.

Such precipitation is effected primarily by diminution of the velocity of the water as compared with the velocity of the water in the stream, taking advantage of the fact that the silt-carrying capacity of water varies as the 6th power of the velocity of the water. It is preferred also to effect precipitation of the silt by imposing a single vertical movement on the body of water in the sump.

Both these effects are brought about in the apparatus shown. The height and diameter of the sump are made sufficiently great in relation to the expected flow of the stream that in passing through the sump in the manner hereafter described, the water loses velocity from that cause. Furthermore, the incoming water is diverted by a hollow pier 5 into the two channels 6, 7 which discharge into the upper part of the sump and at widely separated points of its circumference. There are thus produced two incoming streams indicated by the lines 8 and 9, which, constrained by the curved walls of the sump, impinge upon one another at the farther side of the sump and thereby mutually destroy their velocities to a large extent. The streams, however, are made to be unbalanced so that one preponderates over the other and sets up a definite but slow vortical movement of the whole body of water in the sump as indicated in the plan by the lines 10. The unbalance may be due to one of the separate streams being always larger or of greater velocity than the other, by for instance making the channel 7 somewhat wider and somewhat deeper than the channel 6.

At the lowest part of the sump and at one side thereof there is formed an opening 11. Water flows out of the sump through this outlet, thus setting up a downward and lateral current in the sump which combines with the vortical current and extends the axis of the vortex, at which the precipitate tends to collect, downward and sideways towards the outlet.

The outflowing water flows most rapidly in the region of greatest depth, that is, near to the floor of the sump; and in the lower portion of the opening 11, forming a localized current 12 of silt-carrying velocity. The result is that silt which precipitates from the body of water as a whole and particularly from the centre of the vortex is prevented from lodging at the bottom of the sump, but is picked up by the relatively rapidly moving water there and discharged by it through the opening 11.

The silt-impoverished water from the upper part of the sump is discharged at a higher level than the silt-enriched current. Preferably it is discharged through the upper part of the same opening 11, and so that it emerges beneath the surface of a large body of water contained in a stilling basin 13. Said stilling basin surrounds the sump 4 and is enclosed by a wall 14 providing an overflow lip lower than the top of the sump 4. The wall 14 is shown as circular in plan, but any other form may be employed as required by economic considerations and the necessary length and disposition of the overflow lip 15.

The stilling basin is of large horizontal area and volume relatively to the opening 11, so that the water in it flows slowly enough to precipitate more silt, or at least not to carry away silt which is already entrained in the relatively swift moving current 12. The current from the upper part of the opening 11 which is already flowing slowly relatively to the current 12, spreads, on the whole, outwardly and upwardly as it comes into the stilling basin, and slows down considerably; and thus readily drops a further proportion of silt. It is preferred to set the sump eccentrically in the stilling basin and away from the wall thereof opposite the opening 11, so as to provide ample space there for the water to emerge into.

When the water contains a material proportion of very fine silt, it is preferred to provide outside the opening 11, a filter 16, 17 through which the partly de-silted water flowing from the upper part of said opening 11, has to pass. Said filter may consist of a layer of filtering fabric 16 supported against the flowing water by a metal grid 17.

The silt-impoverished water flows over the wall 14 of the stilling basin, which is of considerable length and thereby prevents undue velocity of the water flowing over it; and passes into the cushioning channel 18, which is provided to protect the foundations of the apparatus. Thence it again overflows into the run-off-channel 19 and by the latter may be discharged into say a reservoir 20 where its reduced silt content diminishes the rate of silting up of the reservoir.

It is preferred to provide guiding means such as the horizontal plate 22 at the opening 11 in order to maintain a horizontal stream line flow conducive to precipitation of silt and to preserve unbroken the silt-carrying current 12 as it passes into the body of water in the stilling chamber 13.

Immediately opposite the opening 11 is the silt discharge outlet 23. This is situated at the bottom of the structure and preferably at the periphery of the stilling basin 13. It may be lower than opening 11, from which a sloping gully 24 extends to it. The outlet 23 opens to an enclosed chamber 25 from which a discharge pipe or discharge pipes 26 lead the silt-enriched current away. The silt may for instance be returned to the stream beyond the reservoir by means of a conduit 27, or preferably it is led as indicated by the conduit 28 to situations where it may be deposited to form new lands or to enrich and deepen existing lands. The water drained off from such depositing places would as a rule gravitate to the reservoir or back to the stream.

Means are provided for controlling the silt discharge outlet 23 so that its effective area varies with the quantity of water flowing in from the stream. A float 29 is provided in a body of water which stands at the level of the water in the stilling basin 13, and is preferably that enclosed in the cavity of the pier 5.

At the outlet 23 is provided a balanced butterfly gate 30 secured at about its diameter to a horizontal shaft 31 pivotally supported at its ends. A member 32 connects the float 29 to the gate so as to open the latter as the water level rises and to allow it to close as the water level falls. To allow a continuous flow of the amount of water necessary to carry off silt when the stream is low, a gap 33 (Fig. III) is left in the lower wing of the gate. The gate and gateway are of elongated form somewhat as shown with the object of keeping them well below the de-silted water lying above the silt-carrying current 12, and confining the outflow only to said current. A vent pipe 34 extending to the atmosphere is provided in the usual manner to prevent vibration in the silt chamber 25.

It is desirable to control the amount of water which is passed away with the silt, not only according to the quantity of the incoming water, as described, but also according to its silt content. That is to say, if the silt content is low, the amount of silt-transporting water relatively to the whole stream, may be reduced. With this object there is provided the non-automatic gate 35 arranged in guides 36 to be lifted and lowered so as to shut off more or less of the silt outlet 23. Said gate is shown as provided with a shield 37 extending horizontally from it into the stream flowing to the outlet. Said shield assists in cutting off the silt-carrying current from the overlying and relatively clear water. It is widest at the centre of its length and tapers away towards its ends in order to equalize the rate of flow through the outlet, by giving less shielding effect at the ends of the outlet where the tendency is for the current to flow slowly. The arrangement of the gate 35 and guides 36 is shown more clearly in the plan view of these items appearing in Fig. V.

While the silt outlet 23 may be provided at any angular position in the basin 13 relatively to the incoming stream from opening 11, it is preferred so to position it that the silt-carrying current 12 returns in the direction of said incoming stream, since the final silt outlet 26 is thereby extended in the direction of the upward slope of the ground and the silt pipe 27 or 28 can thus be laid on or near to the ground surface without the loss of head which would result if they were extended in the opposite direction.

The operation may be re-capitulated thus: The stream is first tranquilized to some extent and its flow equalized by the weir 3. Said weir causes it to be delivered at a reasonably even rate but at relatively high velocity, through the channels 6, 7. In the sump the divided portions of the stream re-unite but so as to a large extent to mutually destroy their velocities, and, so also as to produce a single slow vortex in the sump.

At the base of the sump a silt-carrying current 12 forms and continues through the stilling basin to the silt outlet 23 where it is finally separated from the silt-impoverished water. The latter flows at low velocity through the opening 11, and into the stilling basin where its velocity is again reduced and precipitation of silt into the stream and onto the floor of the basin takes place. The finally silt-impoverished water flows away over the basin wall 14.

I claim:

1. The process of de-silting a natural stream of water which consists in dividing the stream and leading its divided portions into the upper zone of the body of water in opposite directions whereby said portions will impinge together and mutually reduce their velocities to precipitate silt, withdrawing water from a peripheral point of the lowest zone of said body and thereby forming a localized current of silt-carrying velocity along the bottom of said body of water, and separately discharging the remainder of the stream.

2. Apparatus for de-silting a natural stream of water, comprising a circular receptacle, means for dividing the stream, a plurality of conduits of different sizes arranged for conveying the stream divisions to the receptacle in opposite tangential directions, a basin surrounding the receptacle and having an overflow lip below the top of the receptacle, an opening in the receptacle wall extending in height from the lowest part of the receptacle to a level below that of the overflow lip, and a silt outlet in the basin adjacent to said opening.

3. The process of de-silting a natural stream of water which consists in continuously passing the stream into the upper portion of a large body of water and retarding the stream to cause the silt carried by the stream to precipitate into a lower portion of the large body, creating a flow of water of silt-carrying velocity at the bottom of said body to receive the precipitated silt, and discharging only said flow and said silt through a silt discharging outlet.

4. The process of de-silting a natural stream of water which consists in dividing the stream into two separate portions, leading said streams in opposite horizontal directions into a precipitating chamber, discharging water at the bottom of said chamber to create a flow of water moving with such velocity as to carry the precipitated silt from said chamber, and discharging water from said chamber at a region above the discharge of the silt-carrying water.

5. In the process of de-silting a natural stream of water, the steps comprising diverting separate portions of the stream into separate channels the outlet ends of which lead said separate portions in opposite directions to cause a substantial reduction in the velocity of the re-united stream.

6. The process of de-silting a natural stream of water which consists in dividing the stream into two streams of substantially equal velocity and conducting the divided portions into the upper zone of a body of water in substantially opposite tangential directions to set up a differential vortical movement of silt-depositing velocity in said body of water, creating a current of silt-carrying velocity in the lowest zone of said body of water, discharging said current and said silt through a silt discharging outlet, and separately discharging the silt impoverished water.

7. A process of de-silting a stream of water, comprising dividing the stream into two separate streams, one of which has a greater flow momentum than the other, introducing said streams substantially tangentially in opposite directions into a precipitating zone whereby the two streams will impinge together and merge into a single stream flowing circularly in the general direction of the stream of greatest momentum, withdrawing a stream of water from the periphery of said zone adjacent the bottom thereof, and withdrawing another stream of water from the periphery of said zone above the other withdrawn stream.

8. An apparatus for de-silting a stream of water, comprising a basin having a peripheral wall over which water is adapted to flow from the basin, a receptacle positioned in said basin and having a peripheral wall of a greater height than the wall of the basin, means for introducing the stream of water to be de-silted into the upper portion of said receptacle and retarding its velocity to effect a deposition of silt, said receptacle wall having an opening adjacent the bottom of the basin for the discharge of water containing a high percentage of silt, and an opening for the discharge of a stream of de-silted water at a higher level.

9. An apparatus for de-silting a stream of water, comprising a basin having a peripheral wall over which water is adapted to flow from the basin, a receptacle positioned in said basin and having a peripheral wall of a greater height than the wall of the basin, means for dividing said stream into two smaller streams, means for separately discharging said smaller streams tangentially in opposite directions into the upper portion of said receptacle, the peripheral wall of said receptacle having an opening at the bottom for the discharge of a current of water containing the silt deposited by the impingement of said opposed streams of water, a silt outlet in the basin adjacent said opening, and said receptacle wall having an opening above the silt discharge opening but below the top of the basin wall for the discharge of silt-impoverished water from said receptacle to said basin.

10. An apparatus for de-silting a stream of water, comprising a basin having a peripheral wall over which water is adapted to flow from the basin and a bottom sloping to the center of said basin, a receptacle positioned in said basin and having a peripheral wall of a greater height than the wall of the basin, means for dividing said stream into two smaller streams, means for separately discharging said smaller streams tangentially in opposite directions into the upper portion of said receptacle, the peripheral wall of said receptacle having an opening at the bottom for the discharge of a current of water containing the silt deposited by the impingement of said opposed streams of water, a silt outlet in the basin adjacent said opening, the bottom of said basin having a channel formed therein connecting the opening in the receptacle wall and the silt outlet in the basin, and said receptacle wall having an opening above the silt discharge opening but below the top of the basin wall for the discharge of silt-impoverished water from said receptacle to said basin.

11. An apparatus for de-silting a stream of water, comprising a basin having a peripheral wall over which water is adapted to flow from the basin and a bottom sloping to the center of said basin, a receptacle positioned in said basin and having a peripheral wall of a greater height than the wall of the basin, means for dividing said stream into two smaller streams, means for separately discharging said smaller streams tangentially in opposite directions into the upper portion of said receptacle, the peripheral wall of said receptacle having an opening at the bottom for the discharge of a current of water containing the silt deposited by the impingement of said opposed streams of water, a silt outlet in the basin adjacent said opening, the bottom of said basin having a channel formed therein connecting the opening in the receptacle wall and the silt outlet in the basin, said receptacle wall having an opening above the silt discharge opening but below the top of the basin wall for the discharge of silt-impoverished water from said receptacle to said basin, a valve for the silt outlet in the basin, and a float for controlling said valve.

12. An apparatus for de-silting a stream of water, comprising a basin having a peripheral wall over which water is adapted to flow from the basin and a bottom sloping to the center of said basin, a receptacle positioned in said basin and having a peripheral wall of a greater height than the wall of the basin, means for dividing said stream into two smaller streams, means for separately discharging said smaller streams tangentially in opposite directions into the upper portion of said receptacle, the peripheral wall of said receptacle having an opening at the bottom for the discharge of a current of water containing the silt deposited by the impingement of said opposed streams of water, a silt outlet in the basin adjacent said opening, the bottom of said basin having a channel formed therein connecting the opening in the receptacle wall and the silt outlet in the basin, said receptacle wall having an opening above the silt discharge opening but below the top of the basin wall for the discharge of silt-impoverished water from said receptacle to said basin, a valve for the silt outlet in the basin, a float for controlling said valve, and a manually controlled gate for further controlling the flow through the outlet in the basin.

13. A process of de-silting a stream of water, comprising leading the stream into the upper portion of a large body of water to retard the velocity of the stream sufficiently to effect deposition of silt carried thereby, discharging a portion of the water introduced into said large body laterally therefrom at a region above the bottom but beneath the surface into a second large body of water at a region above the bottom thereof but beneath its surface, and discharging water laterally from both bodies of water at the bottom thereof to create a flow from the first-recited body across the bottom thereof and across the bottom of the second body of water to discharge the silt deposited on the bottom from the stream of water introduced into the first body.

14. A process of de-silting a stream of water, comprising dividing the stream into two separate streams, one of which has a greater flow momentum than the other, introducing said streams substantially tangentially in opposite directions into a large body of water whereby the two streams will impinge upon each other and merge into a single stream flowing circularly in the general direction of the stream of greatest momentum, discharging a portion of the water introduced into said large body laterally therefrom at a region above the bottom but beneath the surface into a second large body of water at a region above the bottom thereof but beneath its surface, and discharging water laterally from both bodies of water at the bottom thereof to create a flow from the first-recited body across the bottom thereof and across the bottom of the second body of water to discharge the silt deposited on the bottom from the stream of water introduced into the first body.

FREDERICK VICTOR
WILLIAM SWANTON.